C. J. HAGGLUND.
ATTACHMENT FOR KNIVES.
APPLICATION FILED MAR. 14, 1908.
912,469.
Patented Feb. 16, 1909.
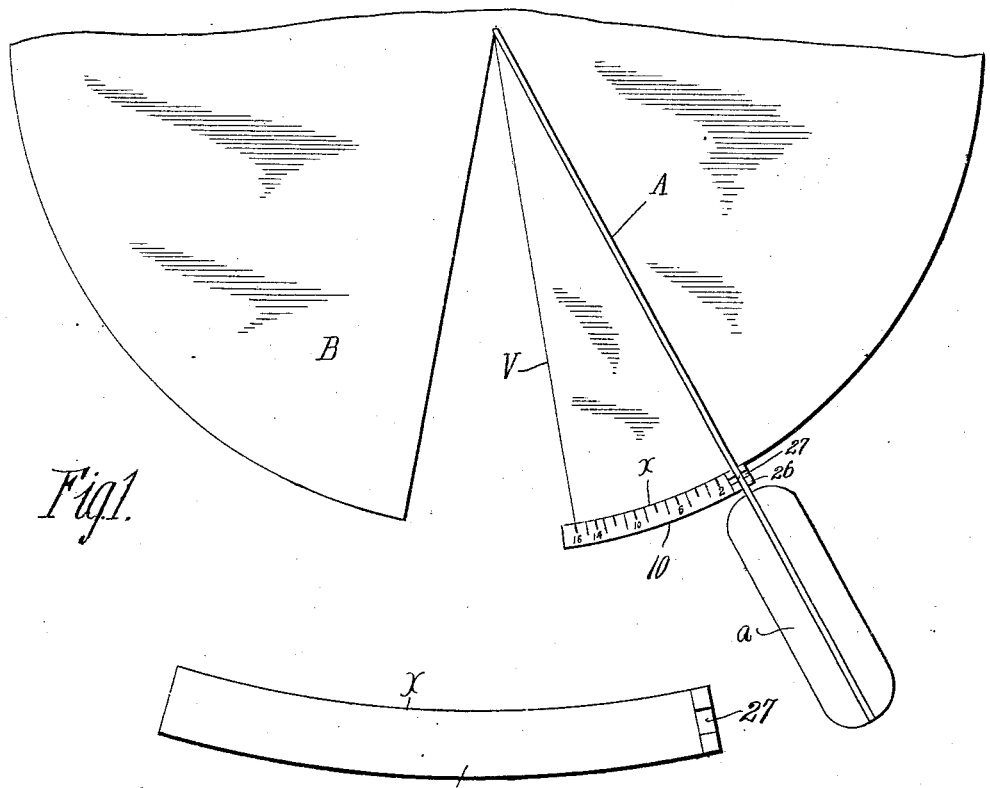
Fig.1.
Fig.2.
Fig.3.
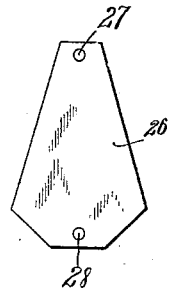
Fig.4.
Witnesses
J. A. Crawford
Geo. W. Suls
Inventor
Carl John Hagglund,
By Chandler & Chandler
Attorneys

UNITED STATES PATENT OFFICE.

CARL JOHN HAGGLUND, OF ESSEX, IOWA.

ATTACHMENT FOR KNIVES.

No. 912,469.  Specification of Letters Patent.  Patented Feb. 16, 1909.

Application filed March 14, 1908. Serial No. 421,187.

*To all whom it may concern:*

Be it known that I, CARL JOHN HAGGLUND, a citizen of the United States, residing at Essex, in the county of Page, State of Iowa, have invented certain new and useful Improvements in Attachments for Knives; and I do hereby declare the following to be a full, clear, and exact description of the invention, such as will enable others skilled in the art to which it appertains to make and use the same.

This invention relates to certain new and useful improvements in attachment for knives.

The object of my invention is to provide a simply constructed attachment in the form of an arc which laterally projects from a blade or knife and is provided with a graduation representing indicia of certain values, as of weight or price.

In the accompanying drawings I have shown in Figure 1 a top view of a cheese knife as provided with my attachment. Fig. 2 shows an enlarged detached bottom view of my knife attachment. Fig. 3 shows an edge view thereof, and Fig. 4 a face view of the washer plate.

The aim of my invention is, to provide a scale marked arc, arranged to be adjustably secured to the blade of a knife adapted for easy use with the hand, whereby the operator or user may readily and speedily remove certain given quantities of predetermined value, from certain manufacturers put up in rolls, or made in shallow cylindrical or conical form, as cheese, large cakes, pies and the like.

My device while arranged to be used in connection with a pie or cake cutting knife, whereby the cake or pie can be divided into a given number of sectors, is especially adapted to be employed in connection with a cheese knife, intended to be used in cutting a cheese of a certain size and shaft into slices of a predetermined weight or value.

In carrying out the object of my invention I employ an arc-shaped plate 10 provided upon the upper surface and proximal to its inner peripheral edge with a scale $x$.

In Fig. 1 the attachment is disclosed as being provided with a scale of 16 graduations and consecutively marked from one to sixteen. Each graduation represents one ounce of cheese when the same is sliced from a cheese of a certain depth and diameter. It is of course understood that this device is to be used in connection with that class or kind of cheese formed in a comparatively shallow cylindrical mold.

The arc 10 is provided with the upstanding flange 23 fixed at one end of the arc, this flange being perforated and threaded as shown at 21 to receive a suitable screw 24. At the same end the arc is also provided with the downwardly extending flange 27 provided with the threaded perforation 22 adapted to receive the screw 25, as disclosed in Fig. 3. In connection with this flange provided end of the arc I use a washer plate 26 provided with the screw-perforations 27 and 28.

In Fig. 1 I have shown a top view of a cheese knife A clamped between the washer plate and the flanges 23 and 27 to securely but removably secure this attachment to the blade. In Fig. 3 the position of the knife is shown in cross section. This knife is provided with the usual handle $a$ and is adapted for easy use with the hand.

Now if it is desired for instance to remove say one pound of cheese from a mold of a given weight and size in connection with which the arc is to be used the operator would place the arc against the edge of the cheese so that the graduation 16 would come adjacent the edge of the previous or first cut $v$ and then carry the blade A through the cheese. As each graduation represents one ounce this operation would have resulted in removing a cheese sector of sixteen ounces.

As has been stated this attachment can also be used when removing slices of predetermined values from pound cake, fruit cake and the like. So also can the attachment be secured to a pie cutting knife.

And having thus described my said invention, what I claim as new and desire to secure by U. S. Letters Patent is—

1. The combination with a knife adapted for use with the hand, of a laterally extending arc secured to said knife, said arc having its inner peripheral edge provided with indicia of weights, as and for the purpose set forth.

2. The combination with a knife adapted for use with the hand, of a laterally extending arc secured to said knife, said arc having its inner peripheral edge provided with indicia of weights, and means to adjustably secure said arc to said blade.

In testimony whereof, I affix my signature, in presence of two witnesses.

CARL JOHN HAGGLUND.

Witnesses:
J. A. EKEROTH,
C. O. GUSTAFSON.